A. B. WRIGHT.
PLOWSHARE.
APPLICATION FILED FEB. 6, 1912.
1,133,211. Patented Mar. 23, 1915.
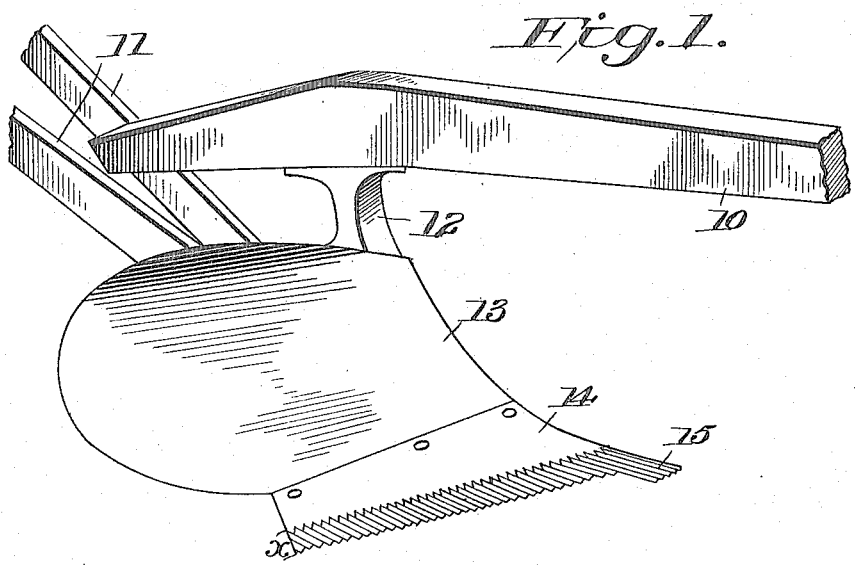
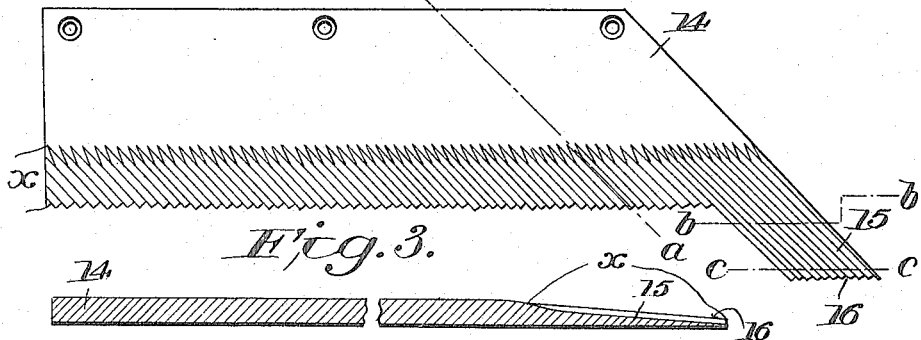
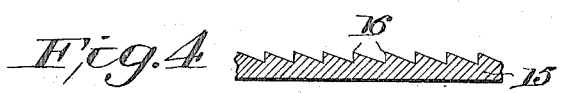
WITNESSES
G. F. Baker.
E. N. Walker.
INVENTOR
Adolph B. Wright
By _____ Attorney

UNITED STATES PATENT OFFICE.

ADOLPH B. WRIGHT, OF WESTON, IOWA.

PLOWSHARE.

1,133,211. Specification of Letters Patent. Patented Mar. 23, 1915.

Application filed February 6, 1912. Serial No. 675,830.

*To all whom it may concern:*

Be it known that I, ADOLPH B. WRIGHT, citizen of the United States, residing at Weston, in the county of Pottawattamie and State of Iowa, have invented certain new and useful Improvements in Plowshares, of which the following is a specification.

This invention relates to plow shares.

One object is to provide the plow share with a serrated edge for the purpose of dividing roots and soil by numerous short lateral cutting edges so as to prevent sliding of roots on the share as on the usual long straight shearing edge and consequently overcoming the wear occasioned on the one continuous long undivided cutting edge of plain shares.

Another object resides in the provision of a plow share embodying among other characteristics a serrated edge with numerous grooves running from the serrations parallel with one another and back upon the share, with the serrations forming laterally directed cutting edges disposed directly with the line of travel of the plow so that the roots will be held in place by the grooves after the edge strikes them and causes them to slide squarely upon the share.

A still further object is to provide a plow share provided with a cutting edge that will efficiently scour, hold and penetrate the roots, cutting them easily and preventing them from sliding on the edge and from sliding off the rear of the share, leaving a row after each furrow and preventing wedging between the share and the land side, thereby saving draft and facilitating a steady and straight run of the plow.

With the above and other objects in view, the invention consists in the construction and novel combination of parts hereinafter more fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings:—Figure 1 is a perspective view of a portion of a plow illustrating my improved share applied thereto. Fig. 2 is a side elevation of the share. Fig. 3 is a sectional view on the line *a—a* of Fig. 2. Fig. 4 is a sectional view on the line *b—b* of Fig. 2. Fig. 5 is a sectional view on the line *c—c* of Fig. 2.

Referring now more particularly to the accompanying drawings, the reference character 10 indicates a beam provided with handles 11 and a standard 12 to which latter may be secured in any suitable manner a mold board 13, with which is associated and connected in any suitable way my improved plow share 14, which has the usual point 15 and which point, together with the cutting edge of the share, is beveled slightly from the points *x—x*.

The cutting edges of the body 14 of the share and its point 15 are notched or otherwise serrated to provide cutting edges 16 disposed preferably laterally with the line of travel of the plow so as to facilitate cutting of roots and the penetration of the soil.

Extending from the laterally directed cutting edges 16 on the share body 14 and also on its point 15, will be seen a plurality of grooves which preferably taper at their upper ends and which are preferably parallel with relation to one another and designed for the purpose of preventing roots, trash, soil and other matter from sliding off of the share in a shearing-like action. In other words, roots and the like will slide squarely upon the share and be held by the grooves after the cutting edges 16 strike the roots. Therefore, while the roots and soil pass directly upon the share instead of sliding on the edge, the edge of the share including its point 15 will wear longer and remain sharp longer than if the cutting edge of the share be of the continuous elongated straight edge.

What is claimed is:—

1. A plow share having its cutting edge divided into a plurality of short stepped cutting edges of substantially the same width and disposed in a plane at substantially right angles to the line of draft.

2. A plow share having its cutting edge divided into a plurality of short cutting edges disposed in a plane at substantially right angles to the line of draft and also provided with a plurality of grooves which recede from the short cutting edges upwardly and rearwardly and in the line of draft, each groove being inclined transversely from one side to the other forming relatively pronounced shoulders disposed parallel with the landside of the share.

In testimony whereof I affix my signature in presence of two witnesses.

ADOLPH B. WRIGHT.

Witnesses:
CLEM F. KIMBALL,
HENRY PETERSON.